United States Patent [19]
Lutz et al.

[11] 3,749,868
[45] July 31, 1973

[54] INSCRIBING DEVICE

[75] Inventors: Herbert Lutz, Senkendorf; Paul Marhoff; Manfred Pfeiler, both of Erlangen; Klaus Frunn, Stadeln; Ulrich Goering, Erlangen-Buchenbach, all of Germany

[73] Assignee: Siemens Aktiengesellschaft, Erlangen, Germany

[22] Filed: May 10, 1971

[21] Appl. No.: 141,764

[52] U.S. Cl................................... 346/23, 346/62
[51] Int. Cl....................................................... G01d
[58] Field of Search............. 346/23, 20, 62, 139 R, 346/139 C

[56] References Cited
UNITED STATES PATENTS

| | | | |
|---|---|---|---|
| 3,163,490 | 12/1964 | Thompson | 346/139 C |
| 3,394,382 | 7/1968 | Fuller | 346/23 |
| 3,454,953 | 7/1969 | Lloyd et al. | 346/23 |
| 3,588,910 | 6/1971 | Zumkeller | 346/62 |

Primary Examiner—Joseph W. Hartary
Attorney—Richards & Geier

[57] ABSTRACT

The invention is concerned with a device for inscribing a scale-like time measure upon a recording strip of an apparatus for presenting physiological measuring values. The invention is particularly characterized by the provision of a time indicator which produces equally spaced time impulses and which delivers them to the inlet of a counting chain consisting of reduction stages connected one behind the other. These stages are connected with an actuating device for the writer of an inscribing device; they supply to the actuating device actuating impulses for regulating the amplitude of the writer for a periodic group division of the time measure.

4 Claims, 2 Drawing Figures

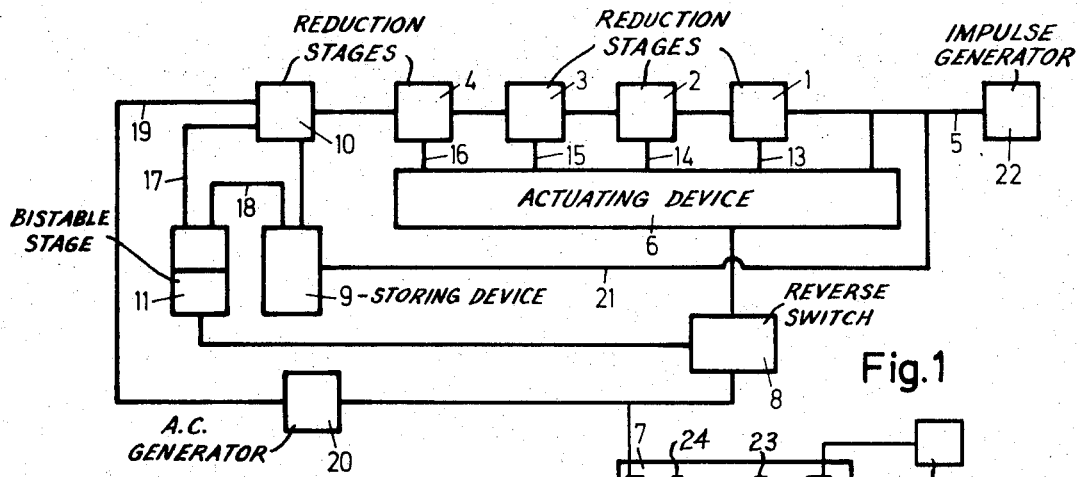
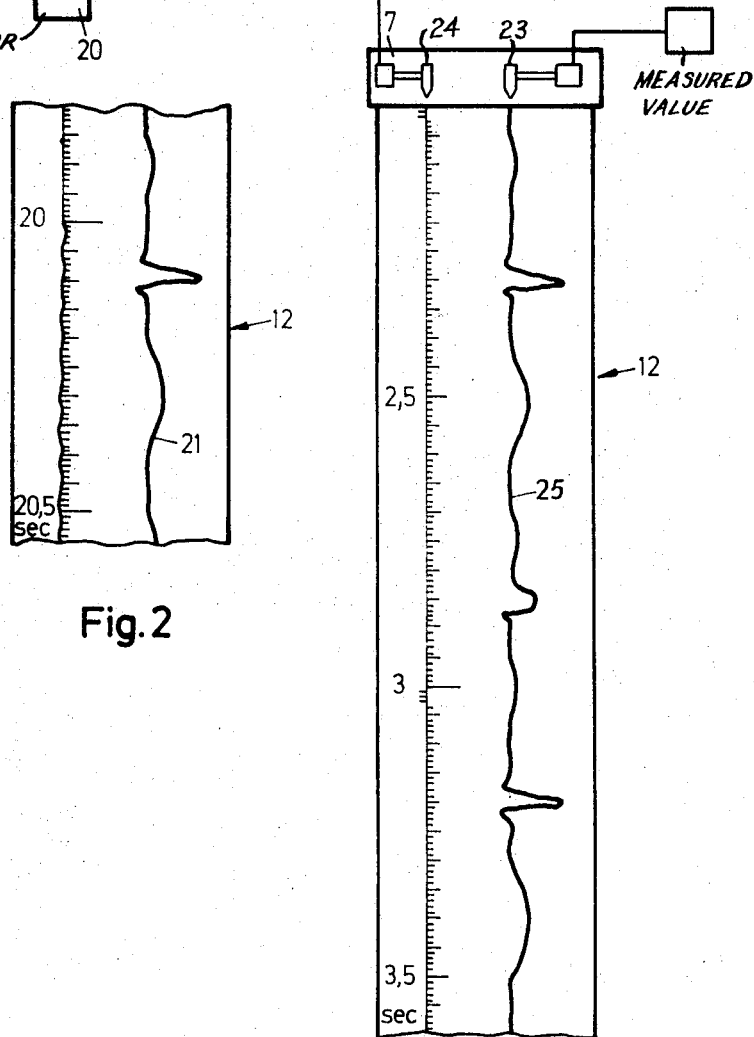
Fig. 1
Fig. 2

INSCRIBING DEVICE

This invention relates to a device for inscribing a scale-like time measure upon a recording strip of an apparatus for presenting physiological measuring values. A time measure of this type which preferably has the shape of a scale consisting of lines, is necessary, for example, when the separate parts of a length of inscribed measure values must be brought to an image storer in a time sequence to X-ray images having time markings and located therein.

Particularly in the case of long continuing film scenes and thus long time measures a quick finding of a location corresponding to an individual image of the X-ray film during the inscribed measure values, is only possible when the time markings of the time measure are combined into equally large groups which are separated from each other by markings.

Thus an object of the present invention is to provide a device of the above described type which will make it possible to find quickly a predetermined location of the time measure, namely, without counting the individual marking lines.

Other objects of the present invention will become apparent in the course of the following specification.

In the accomplishment of the objectives of the present invention it was found desirable to provide a time indicator which produces equally spaced time impulses and conveys them to the inlet of a counting chain consisting of reduction stages connected one behind the other. These stages are connected with an actuating device for the writer of the inscribing device. The stages supply actuating signals for actuating the amplitude of the writer to the actuating device for a periodic group-wise sub-division of the time measure. Thus the outlet voltage of the actuating device can be used to steer the writer of the inscribing device to different widths so that equally large groups of time markings will be separated from each other by markings of a predetermined length.

An advantageous further embodiment of the present invention consists in that a reverse switch is connected behind the actuating device for the writer, the switch being operable by an actuating stage connected behind the counter chain so as to reverse the direction of movement of the writer after a predetermined number of impulses. In this way it is possible to separate from each other by changing the marking direction further groups of time markings in addition of the markings of different lengths.

A particularly advantageous embodiment of the present invention consists in that the operating stage contains a storing device in which is stored the content of the last stage of the counting chain after its switching. The storing device receives the time impulses of the time indicator for step-wise extinction and it maintains the change in the direction of movement of the writer until its entire contents are wiped out.

When a device of the present invention is constructed in this manner it is possible at the beginning of a new second to inscribe a number of lines corresponding to this second in opposed direction relatively to the other lines, so that the second can be determined by counting these lines having opposite direction.

A further advantageous embodiment of this invention consists in that an a.c. generator can be switched on by the last stage of the counting chain after a predetermined number of time impulses has been reached. The generator superposes an alternating voltage upon the outlet voltage of the actuating device for the writer. Thus a separation of further groups of time markings is possible.

The invention will appear more clearly from the following detailed description when taken in connection with the accompanying drawing showing by way of example only, a preferred embodiment of the inventive idea.

In the drawing:

FIG. 1 is a diagram illustrating substantially as a box circuit an embodiment of the present invention.

FIG. 2 shows a portion of a recording strip.

The parts mentioned hereinafter are well known in prior art and for that reason are not described in detail. Most of them are described in the book "Pulse, Digital and Switching Waveforms" by Milliman and Taub, published by the McGraw-Hill Book Company in 1965. Hereinafter this book is referred to as "the above-mentioned book."

The embodiment illustrated in FIG. 1 shows a counting chain consisting of four reduction stages 1 to 4 connected in series one behind the other. The inlet line 5 of the reduction stage 1 receives time impulses from a time impulse generator 22, the spacing of the impulses being the same. The reduction stages 1 to 4 provide by means of an actuating device 6 the shifting of a writing device 24 of a multi-channel writer 7.

A reverse switch 8 provided between the actuating device 6 and the writer 7, is actuated by a storing device 9. The storing device 9 is actuated by a further reduction stage 10 connected behind the reduction stage 4 and is extinguished step-wise by counting impulses supplied through the line 5. A bistable tumbler stage 11 is also provided between the reduction stage 10, the storing device 9 and the reverse switch 8 for actuating the reverse switch 8.

The stages 1 to 4 and 10 correspond to the flip-flop chain described on page 669 of the above-mentioned book. The bistable tumbler stage 11 is described on page 367 of the above-mentioned book. The reverse switch 8 can be also provided by the bistable tumbler stage. The time impulse generator 22 can be an astable multivibrator described on page 439 of the above-mentioned book. The storing device 9 can be a bistable tumbler stage described on page 367 of the above mentioned book. The writer 7 is described, for example, in U.S. Pat. No. 3,163,490.

In order to explain the operation of the illustrated embodiment of the present invention, let it be assumed that the line 5 receives a time impulse every one-hundredth of a second; each of these time impulses through the device 6 provides a line upon a recording strip 12 moved by the writer 7, while the reduction stage 1 transmits after each fifth time impulse an impulse through the line 13 to the actuating device 6, the reduction stage 2 transmits after each tenth time impulse an impulse through the line 14 to the actuating device 6, the reduction stage 3 transmits after each fiftieth time impulse an impulse through the line 15 to the actuating device 6 and the reduction stage 4 transmits after each one-hundredth time impulse an impulse through the line 16 to the actuating device 6. If it is accepted that the reverse switch 8 assumes initially a precise position then the outgoing impulses to the lines 13 to 16 will achieve that groups of five, 10, 50 and 100 lines provided upon the registering strip 12 and constituting the time measure will be limited relatively to each other by lines of different lengths, as is shown in the drawing. This makes it possible to quickly find a predetermined time.

A d.c. generator 20 connected to the reverse switch 8 is similar to the blocking oscillator described on page 609 of the above-mentioned book. The actuating device 6 can be an amplifier the extent of amplification of which can be varied by signals upon lines 13 to 16.

A further simplification in finding a predetermined time moment upon the time measure is provided by actuating the reverse switch 8 after a predetermined number of lines, namely, after every 100 lines. The switch 8 is actuated in that after the hundred lines the reduction stage 10 counting from one to nine is switched further by one step and that its content due to further switching is transmitted to the storing device 9. This will switch over the bistable tumbler stage 11 through the line 17 and thus also the reverse switch 8. The time impulses following the switch change of reduction stage 10 and the transmission of its content to the storing device 9, will cause the storing device 9 to move step-wise again into its zero position since the time impulses are supplied to it through the line 21. After it reaches its zero position it transmits a reverse impulse to the bistable tumbler stage 11 through the line 18, so that when the bistable tumbler stage 11 is switched back again, the reverse switch 8 is also moved again into its initial position.

The described construction results in that at the beginning of each one hundred group the lines of time measure inscribed upon the registering strip 12, i.e., at the beginning of each new second, will inscribe a number of lines corresponding to this second with lines having a direction opposite to that of the other lines. Thus at the beginning of the first second one line will be inscribed, at the beginning of the second second two lines, at the beginning of the third second three lines, etc., these lines having a direction opposed to that of the other lines. Thus the beginning of each second which is also characterized by an excessively long line as well as the second itself can be read in a simple manner upon the recording strip, as is indicated in the drawing.

A further subdivision of the marking upon the recording strip 12 is attained by providing an a.c. generator 20 at the outlet 19 of the reduction stage 10, the outlet voltage of which is superposed upon the outlet voltage of the actuating device 6 for the writing device 24 of the multi-channel writer 7. This has the result that a one hundred group of lines upon a straight basic line and the one hundred group which follows it are always written upon a slightly wavy line, as illustrated in FIG. 2. In this manner it can be immediately determined in which hundred group lies the specific location of the measured value inscribed by a writing device 23 upon the recording strip 12, in the example illustrated an electrocardiogram 25.

A further group division is possible in the illustrated embodiment when the reverse switch 8 is so operated that a certain group of lines, for example the line group corresponding to 20 seconds, is directed in opposite direction to a corresponding earlier group having the same number of lines.

The described embodiment of the present invention is suitable for use in conjunction with an X-ray examining apparatus having a movie camera and a device for illuminating time markings upon the individual pictures of the X-ray film. In that case it is possible to inscribe upon the recording strip of the multi channel writing device a time measure corresponding to the time markings upon the individual pictures. Thus, for example, after the inscription of an electrocardiogram a location in the electrocardiogram corresponding in time to a precise single picture of the X-ray film, can be easily located upon the recording strip.

The described embodiment of the present invention is also suitable for use along with an X-ray examining apparatus provided with an electromagnetic image storing device having a storing band upon which are produced time markings by means of a time impulse generator. These markings appear as numerals upon pictures when the pictures stored upon the band are reproduced. In that case the operation of the device producing the time measure can take place directly from the time impulse generator, namely, time impulses of the time impulse generator can be supplied directly to the line 5. If a motion picture scene stored upon the band is reproduced upon a viewing device, then by stopping the motion picture scene a certain predetermined picture can be examined more closely, the corresponding time indication can be read and the corresponding location of the inscribed measured value, for example of an electrocardiogram, can be quickly found upon the recording strip by the time measure.

We claim:

1. A device for inscribing time measures upon a recording strip, comprising a time indicator producing equally spaced time impulses, a counting chain consisting of a plurality of reduction stages interconnected in series, said counting chain having an inlet connected with said time indicator, an actuating device connected with each of said reduction stages, an inscribing device having a writer, said writer being connected with and actuated by said actuating device, said counting chain supplying said actuating device with actuating signals for actuating the amplitude of said writter for a periodic division of the time measure in groups, a reverse switch connected with said actuating device and said inscribing device, and means connected with said counting chain and said reverse switch for reversing the direction of said writer after a predetermined number of impulses to determine the seconds expired after the beginning of the inscribing.

2. A device in accordance with claim 1, comprising a further reduction stage connected with said counting chain, said means comprising a storing device receiving the contents of said further reduction stage after its switching, said storing device receiving the time impulses of said time indicator for step-wise extinction and causing the reverse direction of said writer to continue until its entire content is extinguished.

3. A device in accordance with claim 2, comprising an a.c. generator connected with said further reduction stage and said inscribing device, said generator being switched on by said further reduction stage after a predetermined number of time impulses has been reached and superposing an alternating current to the voltage of said actuating device outgoing to said writer.

4. A device in accordance with claim 3, wherein said further reduction stage periodically switches on and off said generator.

* * * * *